Jan. 22, 1957    A. L. APPEL    2,778,538
METERING AND DISPENSING DEVICE
Filed Nov. 22, 1954    2 Sheets-Sheet 1
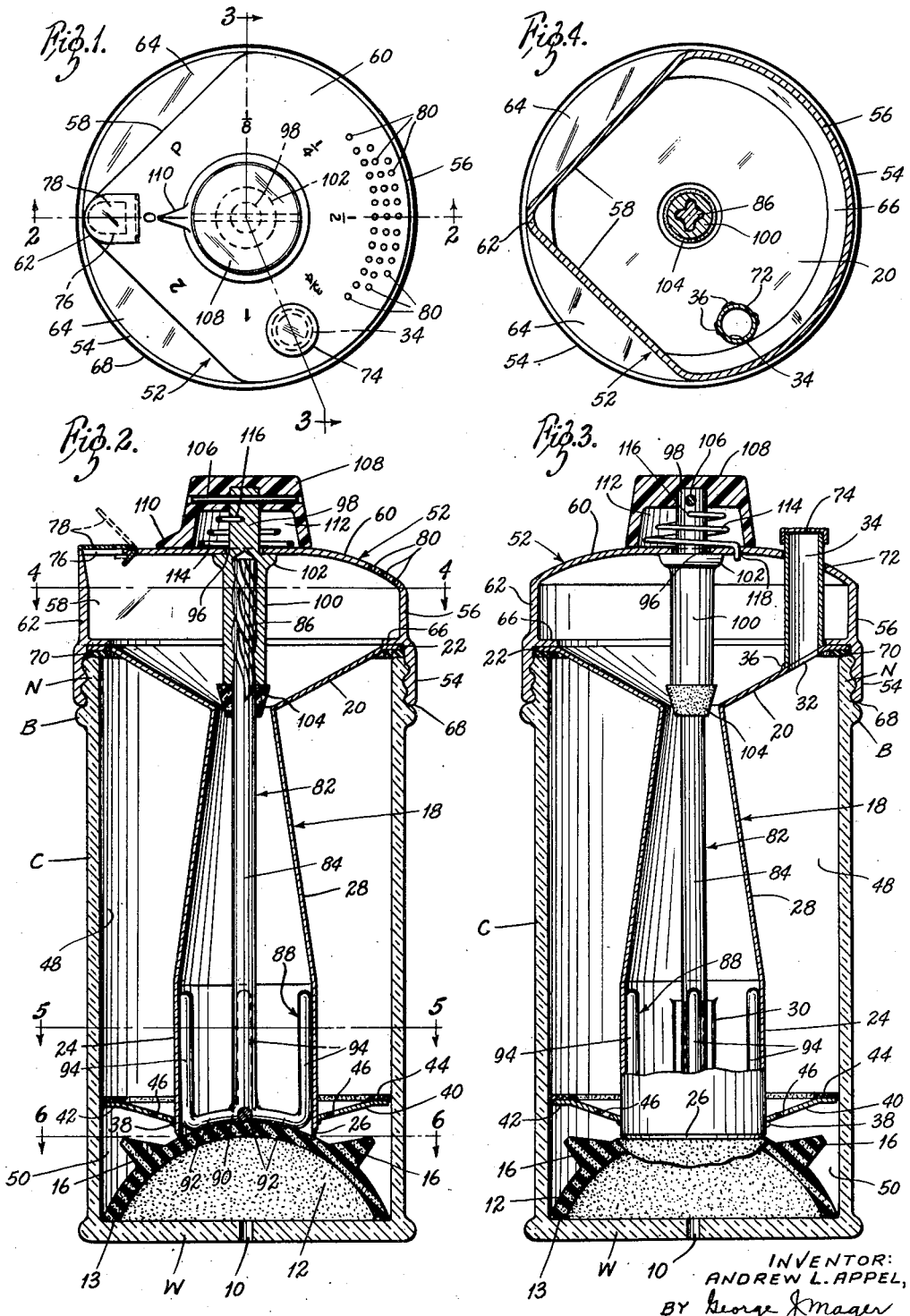
INVENTOR:
ANDREW L. APPEL,
BY George J Mager
HIS ATTORNEY Jan. 22, 1957 A. L. APPEL 2,778,538
METERING AND DISPENSING DEVICE
Filed Nov. 22, 1954 2 Sheets-Sheet 2
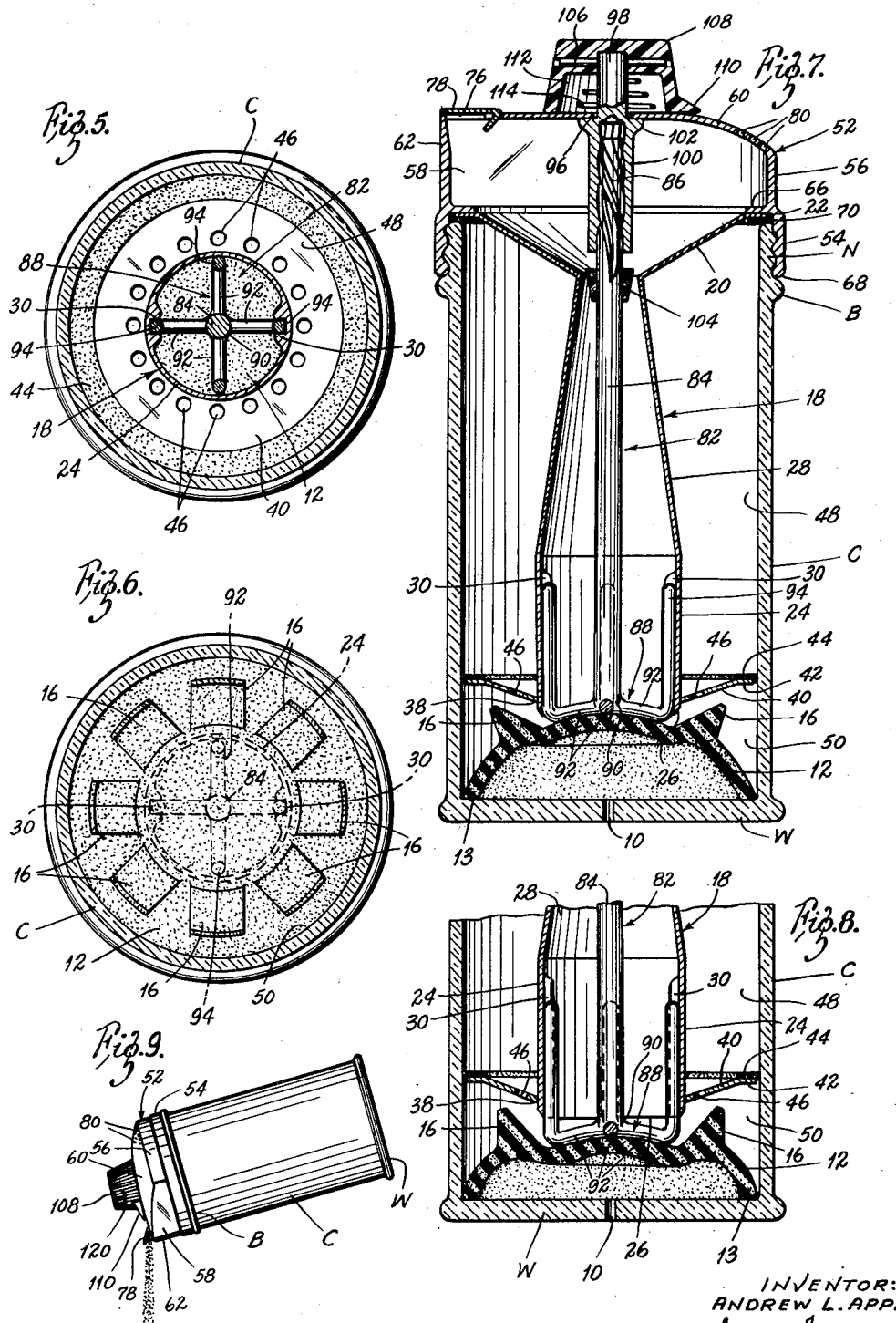
INVENTOR:
ANDREW L. APPEL,
By George J Mager
HIS ATTORNEY

2,778,538

METERING AND DISPENSING DEVICE

Andrew L. Appel, St. Louis, Mo.

Application November 22, 1954, Serial No. 470,307

10 Claims. (Cl. 222—243)

The present invention relates to a novel and improved device designed to measure and dispense granulated materials that are frequently enclosed in handy containers.

More specifically stated, the present invention relates to a novel and improved device adapted for dispensing metered quantities of sugar, salt, baking powder, and so on. Thus, the invention is designed primarily, although not exclusively, for use in domestic and commercial kitchens, in bakeries and in restaurants.

With respect for example to the culinary art, it has been necessary heretofore for a cook to employ spoons, usually termed "measuring spoons," in order to obtain the requisite quantity of sugar, or salt, or baking powder and so on, to be added to the other ingredients prescribed in recipes for the preparation of foods. As is well understood, the success or failure of a dish or a cake for example, is frequently dependent upon the accuracy of the ingredients thereof, particularly those ingredients of the character enumerated above.

The principal object of my invention is to provide a device, preferably but not exclusively for use with conventional sugar or salt containers, adapted to facilitate the measuring and dispensing of specific quantities of fluent materials, particularly materials of a granular nature.

It is another object of the present invention to incorporate means in the device whereby filling and refilling operations may be quickly accomplished.

It is further an object of the invention to provide a device that when not in use, seals the contents of the container against atmosphere. In other words, the instant invention includes means whereby the contents of a container having my device applied thereto are preserved in a dry state, so that the fluidity of said contents will not be impaired by moisture.

Included in the device comprising this invention is a circular closure or cover member that is threaded internally, so that it may be removably secured in place on the externally threaded neck portion of a jar or container of well known configuration. It is to be understood however, that in the absence of a complemental threaded arrangement, the present device may be applied frictionally for example, to the open upper end of any suitable container.

As will be apparent from the detailed description thereof to appear hereinafter, my invention provides novel means adapted to first segregate an approximately accurate quantity of granular material from a mass of granular material in a container; novel means adapted to dispense the segregated quantity of material; novel means adapted to agitate the contents of the container in the course of each dispensing operation; and means responsive to the manipulation of a knob adapted to effect the material segregation function aforesaid.

Means are also provided for filling and refilling the container, and for normally sealing the contents thereof from atmosphere. Preferably, the type of container herein contemplated is of glass or the like, so that its contents are visible. In fact, the present device is primarily, though not necessarily, adapted for use with the well known type of glass containers for sugar found extensively on cafeteria and dining room tables.

The preferred embodiment of my invention is illustrated in two sheets of drawings that accompany this specification. The embodiment of the invention illustrated in these drawings is designed to approximately measure and thereafter dispense any selected one of seven quantities of material. In other words, a pinch, an eighth teaspoonful, a quarter teaspoonful, a half teaspoonful, a three-quarter teaspoonful, a teaspoonful, or two teaspoonfuls of material may be selected by rotating a knob projecting above the top of the cover member into a position wherein a pointer on the knob will coincide with a specific marking provided on the exposed top wall surface of the cover member aforesaid, and thereupon releasing the knob which automatically returns to a position wherein said pointer is directed to the zero marking. The return of the knob to the zero position is affected by a conical torsion spring, as will appear.

A primary opening is provided in the cover member whereby the metered quantities of material may be discharged, said opening being normally closed by a pivotally mounted flap member that functions by gravity. Means are provided in the form of a shell disposed centrally of the container for delivering the metered quantities of material to said opening when the container is swung to discharge position. Said shell includes: an upwardly and outwardly flared upper section having a laterally projecting circular flange that serves to suspend the shell within the container; a cylindrical lower section that cooperates with a stationary hollow rubber ball segment, whereby to segregate the material to be dispensed from the mass of material in the container in response to the reciprocal movement of an actuator that is slidably disposed in said section; and an intermediate conical section connecting the upper and lower sections of said shell.

The movements of the actuator aforesaid are effected by the rotation of the control knob. This knob is rigidly affixed to the upper end of a generally tubular element that is mounted for rotation in the cover member. The actuator includes a rod having its upper end twisted or fashioned into a spirally threaded portion, and said tubular element is correspondingly and complementally threaded internally to receive said spirally threaded end of the rod.

In addition to the primary discharge opening, the cover member may also be provided with a plurality of small discharge openings, preferably in an area diametrically opposite to the primary opening.

Novel features of the construction, and objects and features of the invention not specifically referred to above will be noted in the course of the detailed description thereof to follow with reference to the drawings aforesaid. A more comprehensive understanding of the invention may further be had from the explanation of its operation that will follow said detailed description.

In said drawings:

Figure 1 is a top plan view of a transparent container equipped with a metering and dispensing device incorporating the concepts of the present invention, the control knob of the device being disposed in the zero or neutral position to which it is automatically returned following each metering operation;

Figure 2 is a diametrical vertical sectional view taken along the line 2—2 of Figure 1;

Figure 3 is a diametrical vertical sectional view taken along the line 3—3 of Figure 1;

Figure 4 is a horizontal sectional view through the removable cover member of the device taken on the line 4—4 of Figure 2;

Figure 5 is a horizontal sectional view through the lower portion of the container taken on the line 5—5 of Figure 2;

Figure 6 is a horizontal sectional view also through the lower portion of the container, but taken on a plane below that of Figure 5 approximately on the line 6—6 of Figure 2;

Figure 7 is a view similar to Figure 2, demonstrating the disposition of the movable mechanism of the device when the control knob has been rotated clockwise 180° from its Figure 1 position;

Figure 8 is a fragmentary view similar to Figures 2 and 7, demonstrating the disposition of the movable mechanism of the device when the control knob has been rotated clockwise 270° from its Figure 1 position; and Figure 9 is an elevational view, at a reduced scale, of a container incorporating the present invention disposed in dispensing position.

Preferably but not necessarily, my invention is adapted for use with a conventional container C of clear glass, said container having a cylindrical body terminating at the top in an externally threaded neck portion N formed above an annular bead B. The container also has a base or bottom wall portion W. In accordance with the concepts of this invention, an opening 10 is formed in the wall W, preferably centrally thereof as shown.

All of the mechanism included in the device is of a nature readily removable from the container C, the lone exception being a segment 12 of a hollow rubber ball that is, so to speak, press-fitted into the lowermost portion of the container, with its chordal or marginal edge 13 in intimate contact with the bottom wall W and the adjacent inner periphery of said container, as shown. Projecting upwardly and preferably formed integrally with the ball segment 12, is a series of circularly spaced fingers 16 of the configuration shown. As best seen in Figure 6, the illustrated embodiment of the invention contemplates a series of eight fingers 16, sometimes hereinafter termed material-feeding fingers. In the interest of illustrative clarity however, those fingers that should appear in the background have been omitted in Figures 2, 3, 7, and 8.

Numeral 18 designates generally a shell disposed centrally in the container. The shell 18 includes: an upwardly and outwardly flared upper section 20 that terminates at the top in a laterally projecting circular flange 22; a cylindrical lower section 24 that terminates at the bottom in a horizontal preferably beveled marginal edge 26, best seen in Figures 3 and 8; and a conical intermediate section 28 that connects the sections 20 and 24 of said shell. As shown particularly in Figures 3 and 5, the inner periphery of the cylindrical section 24 is provided with a pair of diametrically opposite vertical slideways 30 for a purpose to appear.

Numeral 32 designates an opening in the flared wall of the section 20, and surrounding said opening is the lower end of a vertical filler pipe 34 that is welded as at 36, or otherwise rigidly secured to said wall.

Rigidly secured to the cylindrical section 24 in a plane above the bottom peripheral edge 26 thereof as by welding 38, is a flared disk 40 that therminates in a horizontal flange portion 42 having a diameter slightly smaller than the internal diameter of the container C. Bonded to the upper surface of said flange portion is a ring 44 of flexible material having a diameter at least equal to the internal diameter of said container. As appears to best advantage in Figure 5, the disk 40 has formed therein a series of circularly spaced holes 46. Said disk and its associated flexible ring 44 divide the container C into an upper compartment 48, and a lower compartment 50.

The cover member is generally designated by the numeral 52, and includes integrally: an internally threaded circular side wall section 54; a substantially semi-circular wall section 56 that merges into a converging wall section 58, these extending upwardly from said side wall section 54; a top wall section 60; an apex wall section 62 that merges into said converging and top wall sections; and a horizontal wall section 64 that merges into the converging wall, the apex wall, and the circular side wall sections, all as clearly shown in the drawings. Internally, the cover member 52 is provided with a circular horizontally disposed flange portion 66, and preferably, the side wall section 54 terminates in a horizontally disposed lower edge portion 68.

When the cover member is properly in place atop the container C with a compressible gasket 70 interposed between the shell flange 22 and the brim of the container neck N, said lower edge portion 68 will be in contact with the container bead B, the peripheral edge 26 of the cylindrical shell section 24 will be disposed in firm engagement with the central area of the ball segment 12, and the internal flange 66 of the cover member will engage against the upper surface of the flange 22.

Numeral 72 indicates a circular opening provided in the top wall 60 to accommodate the filler pipe 34. The upper end of said pipe extends through and projects above the opening 72 to receive a removable closure or cap designated 74. The primary discharge opening 76 of the device is formed in the top wall 60 superjacently to the mergence of the apex and converging wall sections of the cover member, as demonstrated especially in Figures 1 and 2. A pivotally mounted flap 78 functions by gravity to normally cover the opening 76. Formed in an area of the top wall 60 that is diametrically opposite said primary discharge opening 76, is a plurality of small apertures 80, that serve as secondary discharge or sprinkling openings for metered quantities of material, as will be explained.

With attention focused on Figure 1, it is observed that the exposed surface of the cover member top wall 60 is marked to exhibit indicia for the guidance of the user. The individual markings are circularly spaced 45° apart, and indicate in a clockwise direction beginning with the zero mark: a pinch of material; one-eighth teaspoonful of material; a quarter teaspoonful; a half teaspoonful; a three-quarter teaspoonful; one teaspoonful; and two teaspoonfuls of material.

Numeral 82 indicates generally an actuator reciprocable but not rotatable within the shell 18, and adapted to deform the ball segment 12 in the course of a metering operation, as will appear. The actuator 82 includes a rod 84 terminating at the top in a spirally threaded section 86, and at the bottom in a combined guide and plunger member 88 of generally spider-like configuration. That is to say, the combined guide and plunger member 88 of the actuator 82 includes a central body portion 90, and a plurality of circularly spaced legs 92 extending radially therefrom, four legs being preferable. The legs 92 are arcuately contoured correspondingly to the central area of the rubber ball segment 12 as demonstrated in Figures 2, 7, and 8, and said legs may be spaced 90° apart as demonstrated particularly in Figure 5. At its outer end, each leg 92 merges into and terminates in an upstanding guide rod 94. One pair of diametrically opposite guide rods 92 is disposed in slidable contact with the inner peripheral surface of the shell section 24. The other pair of guide rods 94 is slidably disposed in the internal guideways 30 of said section, thus preventing rotational movements of the actuator 82, but facilitating vertical movements thereof as should be apparent. In the illustrated construction, the guide-plunger member 88 is integrally formed with the lower end of the rod 84. Said member may however, be separately formed and rigidly secured to the lower end of said rod if more feasible, as should be evident.

Numeral 96 designates a circular opening formed centrally in the cover member top wall 60. Projecting through and extending above said opening is the integral stem 98 of a generally tubular element designated by the numeral 100. The tubular portion of the element 100 is spirally threaded internally for cooperation with the corresponding spiral threads of the actuator rod section 86, it being noted that the spiral inter-engagement is of a positive, but not of a binding nature. Numeral 102 indicates a circular flange provided on the tubular element 100. Numeral 104 designates a conical collar of rubber or the like that is self-retained in position on the actuator rod 84 for a purpose to appear.

Rigidly secured to the projecting stem 98 of the tubular member 100, as by a pin 106, is a selector knob 108 provided with a pointer 110. The knob 108, illustrated as being of plastic material, has formed therein an annular recess 112, and disposed in said recess about a portion of the stem 98, is a light torsion spring 114 that has its one end anchored in said stem at 116, and has its other end anchored in an aperture 118 provided therefor in the cover member top wall 60 as shown in Figure 3. Preferably, as demonstrated in Figure 9, the selector knob 108 may be externally serrated as at 120 to facilitate rotation thereof.

Prior to explaining the operation and use of the invention, a few general observations will be given. The hollow rubber ball segment 12, though readily lending itself to deformation in response to a downward movement of the actuator 82, is extremely resilient. When during deformations of said ball segment the central portion thereof is depressed, the fingers 16 will obviously move inwardly, as a comparison of Figure 2 and Figure 8 demonstrates. The disk 40, having the ring 44 bonded thereto, tends to stabilize the lower end portion of the shell 18, and also serves to support the mass of material in the upper compartment 48, whereby the mechanism disposed in the lower compartment 50 is adapted to function more effectively. The inter-engagement of the spiral threads formed on the actuator rod segment 86 with the complemental internal threads of the tubular member 100 is so to speak of a loose nature, so that although rotation of said tubular member positively effects reciprocal movement of the actuator 82, there is no tendency of the threads to bind. The collar 104 is provided to seal the tube 100 against ingress of granular material thereinto, when for example, the container C is tilted to a dispensing position such as that exemplarily shown in Figure 9. The torsion spring 114 serves to augment the inherent resiliency of the ball segment 12 in the return of the actuator 82 to normal position, subsequent to a metering operation, and prior to a dispensing operation. It is noted at this point, that the illustrated torsion spring arrangement is exemplary only, and that it or any equivalent spring arrangement may be employed. It is also noted that such spring arrangement may be dispensed with should the inherent resiliency of the rubber ball segment 12 be adequate to return the actuator to normal position following a metering operation.

The container is initially filled, and subsequently refilled, with the material to be dispensed via the pipe 34 with the closure 74 removed. Material entering the upper compartment 48 flows freely into the lower compartment 50 via the circularly spaced holes 46 provided in the disk 40. It should be observed with attention directed to Figure 5, that the holes 46 are comparatively large relatively to the granular particles of the material under consideration. It should also be noted that said holes are provided in the flared portion of the disk 40, as clearly shown in Figures 2, 3, 7, and 8.

Thus, during a filling or refilling operation, the material flows through the holes 46 into the lower compartment 50, and when said compartment has been filled about the ball segment 12, the thereafter introduced material builds up in the upper compartment 48.

It will be remembered that the container C is transparent, so that when the mass of material level in compartment 48 approaches the bead B, this condition would visibly demonstrate that the supply operation should be terminated, as is understood. Conversely, when after repeated dispensings the material level in compartment 48 approaches the disk 40, then such condition would visibly demonstrate that the container should be replenished.

Operation in use

For the purpose of describing the operation of the invention in use, ordinary table salt has been selected to exemplify the material to be measured within, and to be dispensed from the container C. Assuming that said container had been filled via the pipe 34, and assuming further that a certain recipe would prescribe the addition of a pinch of salt to other ingredients, the selector knob 108 would be manually rotated clockwise from the position thereof shown in Figure 1 to a position wherein the pointer 110 would register with the marking P on the exposed surface of the cover member top wall 60, whereupon the knob would be released.

In consequence of this procedure, a sequence of operations would take place. Thus, as the knob 110 is rotated, the tubular member 100 also rotates, whereby the actuator 82 descends a sufficient distance to depress the central portion of the ball segment 12 slightly away from the peripheral edge 26 of the shell section 24. Concurrently, the fingers 16 would move slightly inwardly, whereby to agitate the salt somewhat and to direct some of it toward and into the small space produced between said edge 26 and the depressed portion of said ball segment. Simultaneously also, a slight winding of the torsion spring 114 would result, as should be evident. When the pointer 110 has arrived at the P position, release of the knob 108 automatically effects the return thereof to its Figure 1 position, in consequence of the resiliency of the ball segment 12 and the simultaneous unwinding of the torsion spring. As a result, a small quantity of salt is segregated from the mass of salt in the compartment 50, said segregated quantity of salt being trapped within the lower region of the shell section 24 about the arcuate legs 92 of the actuator guide and plunger member 88. That is to say, as the depressed portion of said ball segment reverts to the normal status thereof portrayed in Figures 2 and 3, the "pinch" of salt that had immediately theretofore gravitated into the depressed area of the ball segment will automatically be projected into the shell section 24, and sealed therein. Assuming now that the container C were taken in hand and tilted angularly into a position such as that exemplified in Figure 9, the segregated pinch of salt would first slide via the shell 18 and cover member 52 toward the primary discharge opening 76 and then therethrough, the closure flap 78 automatically accommodating the discharge of material.

Assuming now that it were desired to dispense a half teaspoonful of salt, the knob 108 would be manually rotated clockwise from its Figures 1 and 2 position to a position wherein the pointer 110 would register with the ½ marking on the cover member, followed by the release of said knob. The disposition of the actuator 82 and the deformed or depressed condition of the ball segment 12 at the moment that pointer 110 is in radial alignment with the ½ marking on the cover member top wall 60, is demonstrated in Figure 7. Immediately subsequent to release of knob 108, said actuator and ball segment would automatically revert in the manner described, to the normal disposition thereof exhibited in Figure 2. Consequently, a half teaspoonful of salt will have been segregated from the mass of salt in container C and trapped within the lower end portion of shell section 24, so that it may be dispensed in the manner hereinbefore described, and as exhibited in Figure 9.

Attention is directed to Figure 8. This view demonstrates the depressed condition of the ball segment responsive to the downward travel of the actuator 82 when the selector knob 108 has been manually rotated to a position wherein the pointer 110 thereof is in radial alignment with the marking 1 exhibited on the cover member top wall 60. Upon release of the knob 108, the ball segment 12 would automatically revert to its normal Figure 1 status, thus trapping within the shell section 24 a quantity of salt, approximately equal to a teaspoonful, that will have been automatically segregated from the mass of salt in the container for dispensing as hereinbefore explained.

In contemplation of the foregoing explanation and reference to the drawings, it is believed to be manifest that any selected quantity of salt or other granular material included within a determinate range may be metered and dispensed in accordance with the concepts of my invention.

The disk 40 having the holes 46 therein, and the flexible ring 44 associated with said disk, serve not only to divide the container into an upper compartment 48 and a lower compartment 50, but further serve also to maintain the mass of salt in the container fluent. In other words, each time container C is tilted into the dispensing position suggested in Figure 9, salt then in the lower compartment 50 flows via the holes 46 into the upper compartment 48. After the completion of a dispensing operation and in the course of the subsequent erection and disposition of container C upon a table or the like, salt again flows into the compartment 50 through the holes 46 as should be apparent. Agitation of the salt about the ball segment in the chamber 50 in consequence of the fluctuation of the fingers 16 during each metering operation, also aids in maintaining the salt in fluent condition, thus facilitating operation of the device. The opening 10 is provided for the escape of air when the ball segment is depressed, as is understood.

It is to be observed that as hereinbefore noted, the conical collar 104 prevents the entry of material into the tubular member 100 during a dispensing operation, inasmuch as whenever the knob 108 is in its normal position, this collar automatically forms a seal about the lower end of said tubular member. The conical contour of the collar also facilitates the passage of the metered material from the section 28 into the flared section 20 of the shell 18 in the course of a dispensing operation.

Attention is directed to the small openings 80 appearing in Figures 1, 2, and 7. As hereinbefore noted, these openings are provided in an area of the cover member top wall 60 that is diametrically opposite the primary opening 76. Therefore, assuming that it were desired to sprinkle the material instead of discharging it via said primary opening, it is only necessary to rotate the container C 180° from the position thereof illustrated in Figure 9 before tilting it to the angular position also there shown.

Although as hereinbefore noted, salt has been selected as a medium particularly well suited to explain the operation and use of the invention, it is to be understood that sugar and other finely divided materials may be metered and dispensed in the manner described.

From the foregoing description and the drawings, it is believed clear that my invention provides novel means for attaining its objectives. I am aware of the possibility of modifications in the particular structure illustrated and described, and therefore the invention is not to be limited to this precise embodiment thereof.

What I claim is:

1. A device for metering and dispensing quantities of granular material from a mass of material contained in a container of the character described, said device including: a cover member for the upper end of the container; means to divide the container into a lower and an upper compartment; means for filling both said compartments with material; metering mechanism disposed in the lower compartment adapted to segregate quantities of material from the mass; manually rotatable means mounted on the cover member for selecting the quantity of material to be segregated, and for simultaneously actuating the mechanism aforesaid; means automatically effective upon release of the manually rotatable means for returning said mechanism to inactive status; a normally flap-closed discharge opening in the cover member; and means adapted to automatically deliver the segregated quantity of material from the metering mechanism to said opening in response to the tilting of the container into an angular position wherein the discharge opening is disposed in a plane below that of the metering mechanism.

2. A device for metering and dispensing quantities of granular material from a mass of material contained in a container of the character described, said device including: a cover member for the upper end of the container; means to divide the container into a lower and an upper compartment; means for filling both said compartments with material; metering mechanism disposed in the lower compartment adapted to segregate quantities of material from the mass; manually rotatable means mounted on the cover member for selecting the quantity of material to be segregated, and for simultaneously actuating the mechanism aforesaid; means automatically effective upon release of the manually rotatable means for returning said mechanism to inactive status; a normally flap-closed discharge opening in the cover member; means adapted to automatically deliver the segregated quantity of material from the metering mechanism to said opening in response to the tilting of the container into an angular position wherein the discharge opening is disposed in a plane below that of the metering mechanism; means included in the means to divide the container into said two compartments for automatically agitating the mass of material during a dispensing operation; and means included in the metering mechanism for automatically agitating the mass of material during a metering operation.

3. In a device for metering and dispensing materials such as salt, sugar, and the like contained in a container of the character described: a cover member for the container; an aperture in the bottom wall of the container; a disk having a flexible ring bonded thereto dividing the container into a lower and an upper compartment; a shell suspended centrally of the container and including a lower cylindrical section terminating in a beveled peripheral edge portion that is disposed in the lower compartment; a segmental portion of a hollow rubber ball disposed in the lower compartment, the arcuate central area of said ball being normally in intimate contact with the beveled edge portion of said cylindrical section of the shell; an actuator vertically reciprocable but not rotatable within said shell, said actuator including a combined guide and plunger member also normally in intimate contact with said central area of the ball segment and a rod terminating at the top in a spirally threaded section; a generally tubular element spirally threaded internally for cooperation with the corresponding spiral threads of the rod aforesaid depending from said cover member and terminating in a stem projecting through and extending above an opening provided therefor centrally in the top wall of the cover member; and a manually rotatable knob rigidly secured to said projecting stem of the tubular member, rotation of said knob in a clockwise direction serving to correspondingly rotate said tubular member whereby to effect the descent of the actuator to depress said central area of the rubber ball segment.

4. In a device for metering and dispensing materials such as salt, sugar, and the like contained in a container of the character described: the structure set forth in claim 3, and means supported by said cover member and shell for filling the upper and lower compartments of the container with the material to be metered and dispensed.

5. In a device for metering and dispensing materials such as salt, sugar, and the like contained in a container of the character described: the structure set forth in claim 3, and a normally closed discharge opening provided in the cover member in fluid communication via said shell with the lower compartment.

6. In a device for metering and dispensing materials such as salt, sugar, and the like contained in a container of the character described, the structure set forth in claim 3, wherein the shell suspended centrally of the container and including a lower cylindrical section terminating in a peripheral edge portion that is disposed in the lower compartment further includes: an upwardly and outwardly flared upper section that terminates at the top in a laterally projecting circular flange portion; a conical intermediate section connecting said lower and upper sections; and a pair of diametrically opposite vertical slideways provided along the inner periphery of the lower section aforesaid to facilitate reciprocable but prevent rotatable movements of said actuator.

7. In a device for metering and dispensing materials such as salt, sugar, and the like contained in a container of the character described, the structure set forth in claim 3, wherein the combined guide and plunger member is of generally spider-like configuration and includes: a central body portion; a plurality of circularly spaced legs extending radially from said body portion, said legs being arcuately contoured correspondingly to said central area of the rubber ball segment; and upstanding guide rods each merging into and forming the terminal end of one of said legs.

8. In a granular material metering and dispensing device for use with a container of the character described: a manually rotatable knob for selecting a quantity of material to be metered and dispensed; metering mechanism operable responsive to rotations of said knob to segregate the selected quantity of material from the mass of material in the container; means included in the metering mechanism for agitating the material thereabout during a metering operation; means for automatically returning said knob to normal position following a metering operation; at least one opening to discharge material from the container; and means for delivering the segregated quantity of material to said opening when the container is tilted into a position wherein said discharge opening is in a plane below that of said metering mechanism.

9. In a device of the character and for the purpose described: a metering mechanism; an actuator for effecting the operation of said mechanism, said actuator including a vertically reciprocable rod and a combined guide and plunger member rigid with the lower end of the rod, said member being of generally spider-like configuration and comprising a central body portion having a plurality of arcuately formed leg members extending radially therefrom, each leg member merging into and terminating in an upstanding rod portion; spirally formed threads on the upper end of said rod; and a conical collar of rubber or similar material self-retained about said rod at the lower end of the spirally formed threads thereon aforesaid.

10. In a device of the character and for the purpose described, the structure recited in claim 9, and means for effecting downward movements of said actuator, said means comprising: a generally tubular member having spirally formed internal threads therein corresponding to and complemental with the spirally formed external threads on the upper end of said actuator rod; a stem integral with and projecting upwardly from said tubular member; and a manually rotatable knob rigidly secured to said stem.

References Cited in the file of this patent

UNITED STATES PATENTS

| | | |
|---|---|---|
| 597,077 | Ackermann | Jan. 11, 1898 |
| 933,699 | De Laurence | Sept. 7, 1909 |
| 1,868,298 | Wallo | July 19, 1932 |
| 1,941,745 | Higley | Jan. 2, 1934 |
| 2,554,710 | Leccese | May 29, 1951 |
| 2,579,977 | Sjolin | Dec. 25, 1951 |